(No Model.) 2 Sheets—Sheet 1.

J. C. & W. L. THOMPSON.
FOLDING BOX OR CRATE.

No. 409,523. Patented Aug. 20, 1889.

Witnesses
Inventor
Jesse C. Thompson
William L. Thompson
By their Attorney (No Model.) 2 Sheets—Sheet 2.
J. C. & W. L. THOMPSON.
FOLDING BOX OR CRATE.

No. 409,523. Patented Aug. 20, 1889.

Witnesses Inventor
Jesse C. Thompson
William L. Thompson
By their Attorney

UNITED STATES PATENT OFFICE.

JESSE C. THOMPSON AND WILLIAM L. THOMPSON, OF ORMANVILLE, IOWA.

FOLDING BOX OR CRATE.

SPECIFICATION forming part of Letters Patent No. 409,523, dated August 20, 1889.

Application filed May 29, 1889. Serial No. 312,508. (No model.)

*To all whom it may concern:*

Be it known that we, JESSE C. THOMPSON and WILLIAM L. THOMPSON, of Ormanville, in the county of Wapello and State of Iowa, have invented certain new and useful Improvements in Folding Boxes or Crates; and we do hereby declare the following to be a full, clear, and exact description of the invention, such as will enable others skilled in the art to which it appertains to make and use the same.

Our invention relates to an improvement in folding or knockdown boxes or crates, the object being to provide a box or crate consisting of few parts, which may be opened or closed and securely locked together against accidental displacement, either in its open or closed adjustment, and, further, to provide a box or crate which may be manufactured and placed on the market at a slight cost, and one which will occupy as little space as possible, whether opened or closed.

With these ends in view our invention consists in certain novel features of construction and combinations of parts, as will be hereinafter fully described, and pointed out in the claims.

Figure 1:
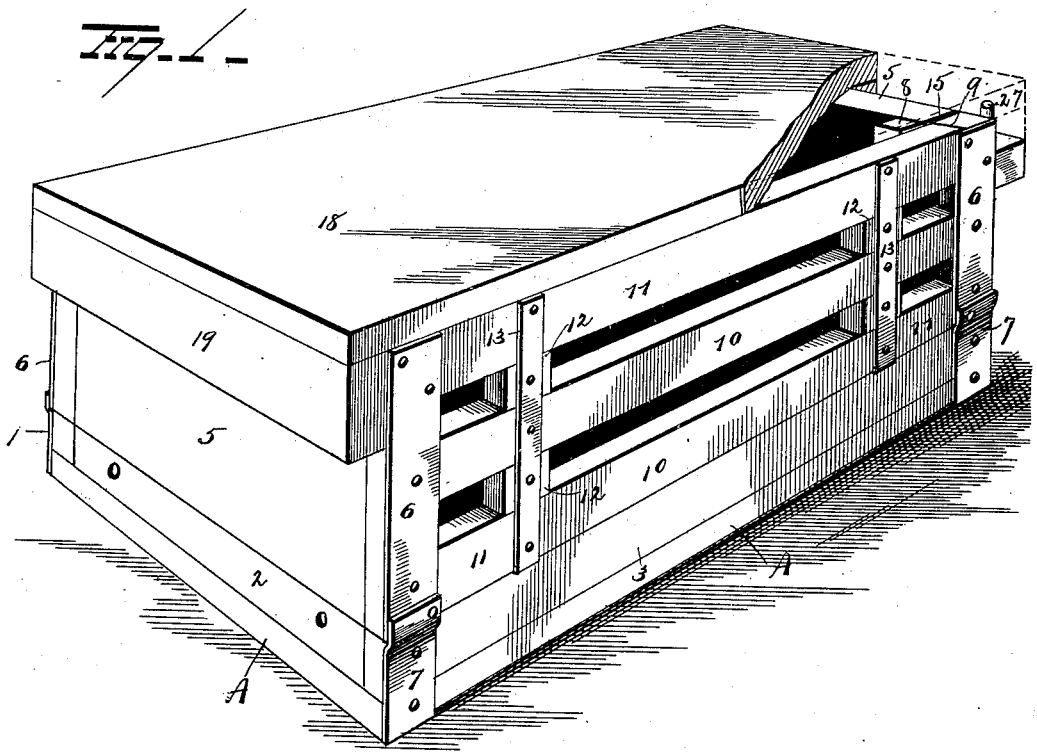
Figure 2:
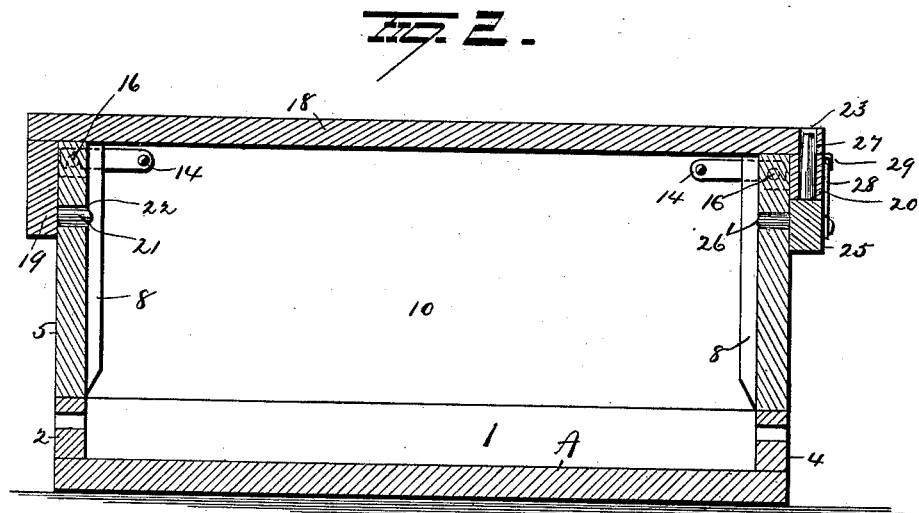
Figure 3:
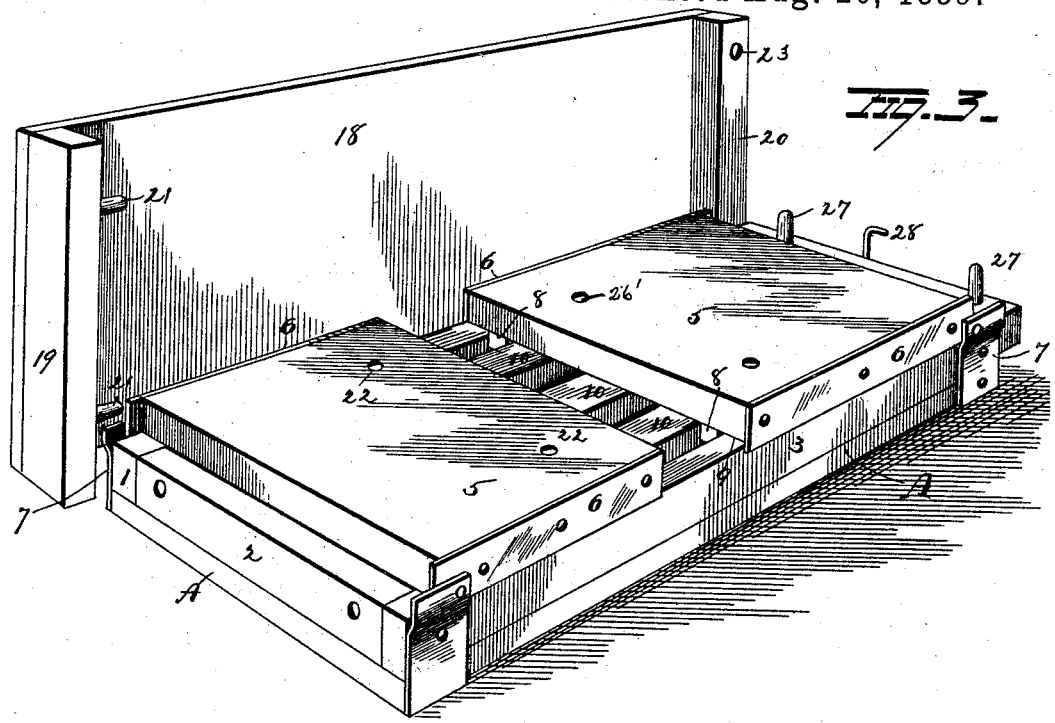
Figure 4:
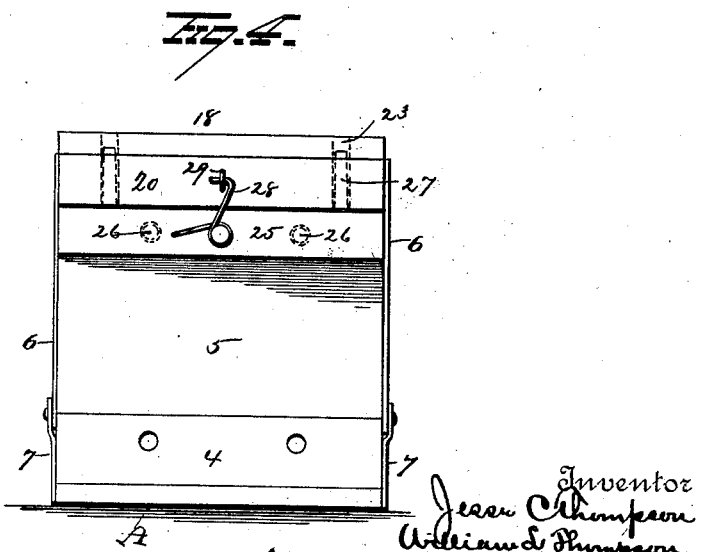

In the accompanying drawings, Figure 1 is a view in perspective of the box or crate with the cover partly broken away. Fig. 2 is a sectional view of the same. Fig. 3 is a view showing the box or crate folded, the cover being removed; and Fig. 4 is a detached view of the removable locking or dowel block.

A represents the bottom of the box or crate. It is preferably of oblong shape and has the narrow strips 1, 2, 3, and 4 secured to its edges, these strips being of sufficient width to form an inclosure deep enough to receive the removable sides, as will presently appear. The end sections 5 5 of the box are provided with plates 6 6 on their edges, and the lower ends of these plates, which preferably project a little beneath the lower edge of the end section, are hinged or pivoted to the plates 7 7, secured at the ends of the side strips 1 and 3. This pivoting is done at the inner edge, so that when the end sections are raised they are supported upon the end strips 2 and 4, which latter prevent them from folding backward. The plates 6 6 are made a little wider than the thickness of the end sections, and they are so placed that one edge projects inwardly, forming, with the cleats 8 8, grooves 9 9 for the reception of the removable side sections 10 10. The side sections or pieces 10 10 extend from end to end, sliding edgewise into the grooves and filling the spaces left between the ends. These side sections may be plain or made of slats, as shown; or, preferably, there may be one of each variety, as this would admit of the circulation of an ample supply of air, and also display the contents throughout the crate, and thus avoid any risk in purchasing the crates or loss of time in opening them in order to make a careful examination of the fruit contained therein. In the open side sections the slats 11 11 are held apart by spacing-blocks 12 12, and narrow strips of sheet metal 13 are bent around them to maintain the shape of the side piece. When slid into the grooves 9 9, the pivoted hooks 14 14 are swung around and inserted into the recesses 15 15, where they engage pins 16 16. When the side sections or pieces are placed in position, the end sections are held up and the hooks 14 14 prevent displacement of parts. The box or crate thus formed is very strong, the various parts bracing one another, so that there is no danger of collapse.

The cover consists of the board 18, preferably the same width as the bottom and a little longer. It has on its ends the depending ledges 19 and 20, which extend over the upper edges of the end sections, and are secured to the latter in the following manner: The ledge 19 is a little wider than ledge 20, and is provided with inwardly-projecting dowel-pins 21 21, which enter the dowel-sockets 22 22 in the end section opposite it. The narrower ledge 20 is provided with dowel-sockets 23 23 in its lower edge.

A removable dowel or locking-block 25 is provided with two sets of dowel-pins 26 27 on adjacent sides. The pins 26 are adapted to be removably secured in dowel-sockets 26' in the end section, and the upturned pins 27 enter the dowel-sockets 23 23 in the lower edge of ledge 20. This removable dowel or locking-block is provided with a spring catch or hook 28, which is adapted to enter the staple 29 on the side of ledge 20 to lock the cover on.

It will also be observed that the end pieces 2 and 4 are furnished with dowel-sockets in corresponding positions to those already described, the object being to receive the pins 21 21 of the cover and the pins 26 of the removable block 25 when the box or crate is closed or knocked down. Another point to be mentioned is that the block 25 might also be placed on the other end, and the cover could be turned the other way.

To fold the box or crate, the side sections are removed and placed in the bottom. The end sections are then folded down, the locking-block is lowered, and the cover is placed on first by an endwise movement to insert the dowels in the end section, and then by a downward movement at the other end just as when placed on the box or crate as set up.

It is evident that other slight changes might be resorted to in the form and arrangement of the several parts described without departing from the spirit and scope of our invention, and hence we do not wish to limit ourselves to the particular construction herein set forth.

Having fully described our invention, what we claim as new, and desire to secure by Letters Patent, is—

1. In a folding or knockdown box or crate, the combination, with a bottom and end and side sections, of a locking-block removably connected with the body and a removable cover adapted to engage and be held in position by the locking-block, substantially as set forth.

2. In a folding or knockdown box or crate, the combination, with a body, end and side sections, and a locking-block removably secured to one end section, of a removable cover adapted to engage one end of the box and be engaged by the locking-block, substantially as set forth.

3. In a folding or knockdown box or crate, the combination, with a bottom and end and side sections, of a locking-block removably secured to one end of the box, a removable cover adapted to engage the locking-block, and a locking device on the locking-block for securing the cover in position, substantially as set forth.

4. The combination, with a bottom having a rim around its edge, end sections hinged by intermediate connections to the bottom, and removable side sections adapted to enter grooves in the end sections, of a removable cover having dowel-pins at one end adapted to enter dowel-sockets in one of the end sections, and a removable locking-block having dowel-pins by which it is held to one of the end sections, and also pins which enter the cover, and a spring-catch on the block adapted to lock the cover, substantially as set forth.

5. The combination, with a bottom having a rim on its edges, end sections hinged to the rim, said sections having grooves therein, and removable side sections adapted to slide in the grooves and provided with pivoted hooks to engage pins on the end sections, of a removable cover having depending ledges at the ends, dowel-pins in one ledge to enter sockets in the ends of the box, and a removable locking-block having dowel-pins adapted to be inserted in one end of the box and in one of the ledges of the cover, said block having a spring-actuated hook for locking the cover in place, substantially as set forth.

In testimony whereof we have signed this specification in the presence of two subscribing witnesses.

JESSE C. THOMPSON.
WILLIAM L. THOMPSON.

Witnesses:
S. E. ADLER,
LOUISE ADLER.